United States Patent [19]

Zaüscher

[11] 4,194,207
[45] Mar. 18, 1980

[54] RADIOLOCATION SYSTEM FOR DETERMINING THE DIRECTION OF INCIDENT ELECTROMAGNETIC WAVES

[75] Inventor: Hermann Zaüscher, Wörthsee, Fed. Rep. of Germany

[73] Assignee: C. Plath GmbH Nautisch Elektronische Technik, Hamburg, Fed. Rep. of Germany

[21] Appl. No.: 902,821

[22] Filed: May 4, 1978

[30] Foreign Application Priority Data

May 5, 1977 [DE] Fed. Rep. of Germany ....... 2720222

[51] Int. Cl.² .............................................. H04B 7/00
[52] U.S. Cl. .................................... 343/120; 343/123
[58] Field of Search ................ 343/120, 121, 122, 123

[56] References Cited

U.S. PATENT DOCUMENTS

| | | | |
|---|---|---|---|
| 2,256,619 | 9/1941 | Luck | 343/120 |
| 2,513,485 | 7/1950 | Herrick | 343/120 |
| 3,042,917 | 7/1962 | Elhoff | 343/120 |
| 3,106,710 | 10/1963 | Stover | 343/120 |
| 3,332,082 | 7/1967 | Hatch | 343/120 |
| 3,441,900 | 4/1969 | Ulstad et al. | 343/120 |
| 3,495,246 | 2/1970 | Schonenborn | 343/120 |
| 3,824,596 | 7/1974 | Guion et al. | 343/120 |
| 3,987,446 | 10/1976 | Lipsky et al. | 343/120 |

FOREIGN PATENT DOCUMENTS

1170481 5/1964 Fed. Rep. of Germany ........... 343/120

*Primary Examiner*—Theodore M. Blum
*Attorney, Agent, or Firm*—Karl F. Ross

[57] ABSTRACT

An antenna array for a radiolocation system, consisting of three loop antennas in mutually orthogonal planes and three dipole antennas extending along the intersections of these planes, is scanned by a pair of synchronized multplexers sequentially connecting two receiving channels to different loops and to different dipoles in a recurrent cycle. The loop and dipole voltages concurrently appearing in the outputs of the two receiving channels are fed to an analog multiplier; the resulting product, after filtering and integration, is converted to digital form and written into a memory stage assigned to the respective loop/dipole combination. The registered products are sequentially read out, in the rhythm of the scan, and are processed in a digital calculator to yield azimuthal and/or elevational data which are stored and visually displayed.

3 Claims, 3 Drawing Figures

RADIOLOCATION SYSTEM FOR DETERMINING THE DIRECTION OF INCIDENT ELECTROMAGNETIC WAVES

FIELD OF THE INVENTION

My present invention relates to a radiolocation system for determining the direction of incident electromagnetic waves.

BACKGROUND OF THE INVENTION

According to a prior invention of mine, described in German Pat. Nos. 1,080,633 and 1,170,481 as well as German published specification No. 1,798,346, azimuthal and/or elevational data required for finding the direction of an incoming beam are determined with the aid of an antenna array comprising three loop antennas and three dipole antennas. The three loop antennas are located in mutually orthogonal planes whose intersections are in line with the dipoles. The analog voltages appearing on respective output terminals of these two sets of antennas are multiplied in various combinations and the resulting voltage products are algebraically combined to yield the desired data. For azimuth determination, four such multiplications will suffice; to find both the azimuth and the angle of elevation, six multiplications are needed.

For a correct evaluation of the intercepted radiation, the six channels carrying the output voltages of the three loop antennas and the three dipole antennas must be accurately calibrated so that their phase and attenuation characteristics are identical over the entire frequency range. Manual recalibrations, generally necessary before each measuring operation, are time-consuming and prevent the evaluation of incident signals of short duration. Circuitry for automatic recalibration is available but is rather complex and correspondingly expensive.

OBJECT OF THE INVENTION

The object of my present invention, therefore, is to provide a system for carrying out the aforedescribed mathematical operations on a group of six analog voltages, derived from three loop antennas and three dipole antennas, in a manner greatly simplifying the problem of calibration.

SUMMARY OF THE INVENTION

In accordance with my present invention, a multiplicity of antenna pairs—i.e. combinations of a dipole antenna with a loop antenna—are sequentially scanned, in successive phases of a recurrent cycle, to obtain respective analog output voltages therefrom. The two output voltages simultaneously derived from the scanned antenna pair in each phase are then multiplied and the resulting product is registered in a memory stage respectively assigned to that phase. The voltage products so registered are then algebraically combined, as known per se from the above-identified German patent specifications and as more fully described hereinafter, to obtain the requisite directional data.

The scanning of the six antennas is carried out, according to another aspect of my invention, by first and second preferably electronic switch means (such as multiplexers) respectively connecting individual outputs of a set energized by the dipole antennas to a first receiving channel and individual outputs of a set energized by the loop antennas to a second receiving channel, the two switch means being jointly operated by scanning means also controlling third switch means for sequentially connecting a single multiplication means to the several memory stages that are to be loaded sequentially with the voltage products obtained in the respective phases. Thus, my improved method and system reduces the number of receiving channels from six to two, with consequent simplification of the calibration problem.

Pursuant to a more particular feature of my present invention, the analog voltage products successively obtained from the multiplication means are digitized by a suitable converter before being loaded into their assigned memory stages.

BRIEF DESCRIPTION OF THE DRAWING

The above and other features of my invention will now be described in detail with reference to the accompanying drawing in which:

FIG. 3 is a perspective illustration of an antenna array, as shown in German Pat. No. 1,080,633, which furnishes the output voltages to be processed in the system of FIG. 1 or 2.

SPECIFIC DESCRIPTION

Reference will first be made to FIG. 3 which shows an antenna array of the type described in the above-identified German Pat. No. 1,080,633. The array comprises three mutually orthogonal dipoles $D_x$, $D_y$, $D_z$, intersecting in a common point and extending along respective coordinate axes x, y and z, and three loop antennas $R_x$, $R_y$, $R_z$ centered on the point of intersection of the dipoles. Loops $R_x$, $R_y$ and $R_z$ respectively lie in the planes yz, zx and xy.

Figure 1:
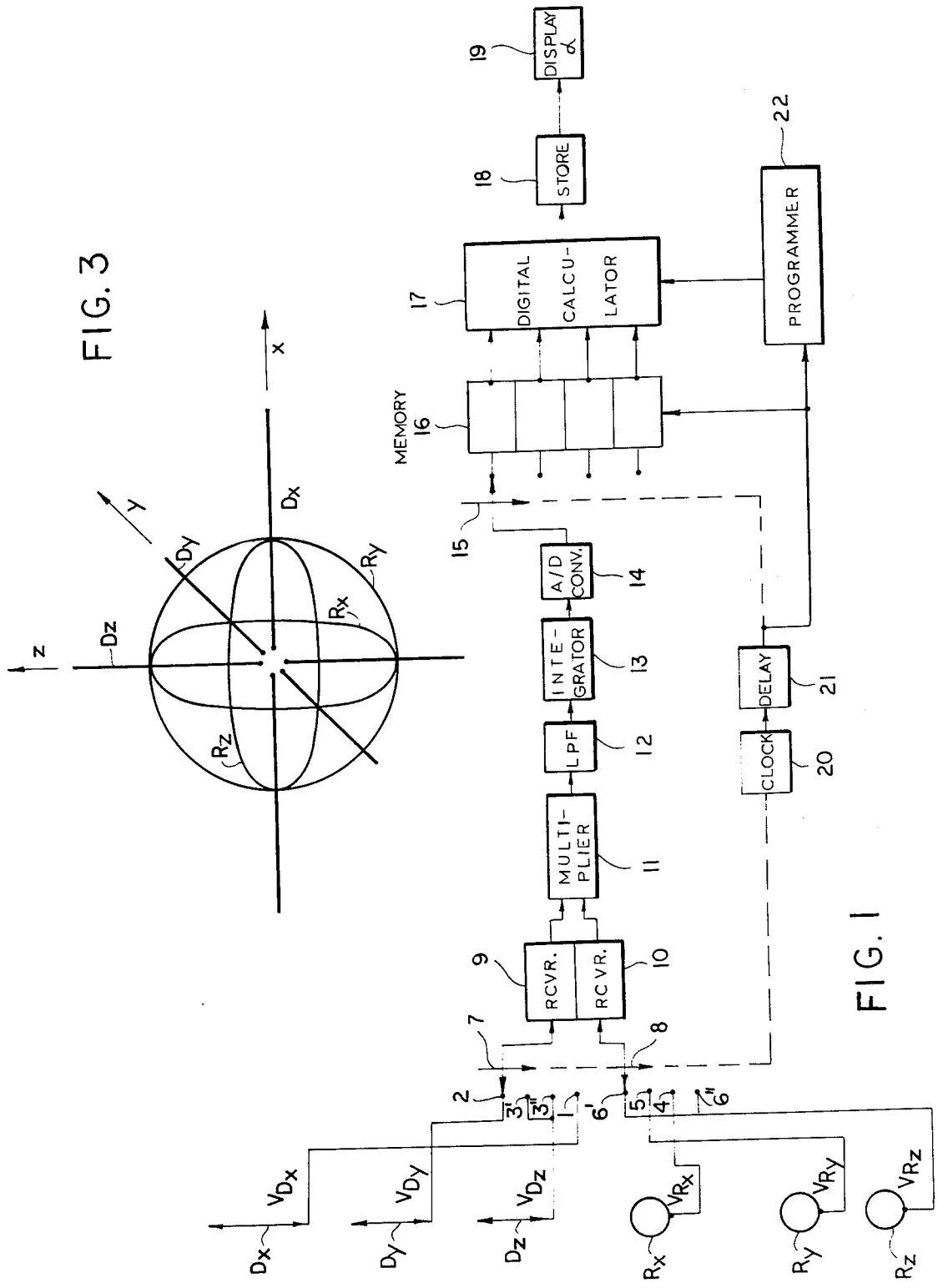
FIG. 1 is a block diagram of a radiolocation system according to my invention, designed to determine the azimuth angle of an incident radar-frequency beam.

In FIG. 1 I have shown output terminals 1, 2 and 3', 3'', respectively connected to dipoles $D_x$, $D_y$ and $D_z$, as well as output terminals 4, 5 and 6', 6'', respectively connected to loops $R_x$, $R_y$ and $R_z$. The two banks of output terminals are concurrently scanned, under the control of a clock-pulse generator 20, by a pair of multiplexers 7 and 8 working into respective receivers 9 and 10. Analog signal voltages detected in these receivers are fed to respective inputs of a multiplier 11 emitting the product of the terminal voltages that are sampled in a given phase of a scanning cycle in the outputs of multiplexers 7 and 8, namely $V_{Dy} \cdot V_{Rz}$ in a first phase, $V_{Dz} \cdot V_{Ry}$ in a second phase, $V_{Dz} \cdot V_{Rx}$ in a third phase, and $V_{Dx} \cdot V_{Rz}$ in a fourth phase. These products traverse a low-pass filter 12 and an integrator 13 (which could be combined into a single circuit) eliminating all accompanying high-frequency components; integrator 13 is connected to an analog/digital converter 14 whose output is successively fed via a multiplexer 15 into respective stages of a 4-stage memory 16. Multiplexer 15 is stepped by the clock 20 at the same rate as multiplexers 7 and 8, but with a lag introduced by a delay circuit 21 which compensates for the retardation experienced by the incoming signals in circuits 9–14.

The stored products are cyclically read out from memory 16, again under the control of clock 20 and delay circuit 21, into a digital calculator 17 which performs the algebraic operations necessary to obtain azimuthal data relating to the direction of incidence of the radiation intercepted by the antenna array. A programmer 22, also stepped by clock 20 through delay circuit 21, controls the operations of calculator 17 and causes it to load the results into a store 18 where they are periodically updated. Store 18 works into a display device 19, such as an oscilloscope, visually indicating the azimuth angle α.

Figure 2:
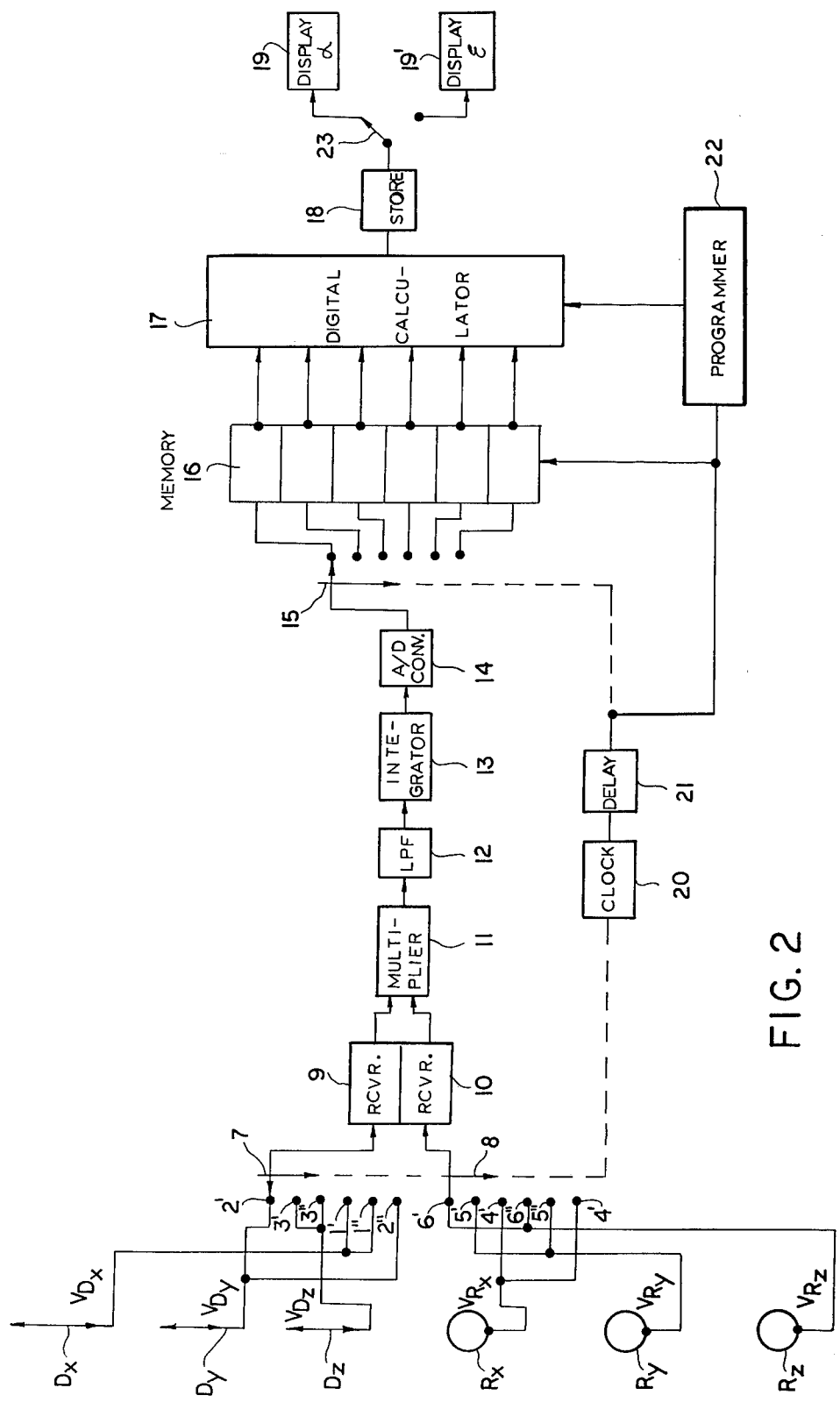
FIG. 2 is a diagram similar to FIG. 1, showing a modified system for the determination of both azimuthal and elevational data.

FIG. 2 shows a circuit arrangement generally similar to that of FIG. 1, except that each antenna group $D_x$, $D_y$, $D_z$ and $R_x$, $R_y$, $R_z$ has two output terminals respectively designated 1'-6' and 1"-6". Each scanning cycle, therefore, now has six phases in which the products $V_{Dx} \cdot V_{Ry}$ and $V_{Dy} \cdot V_{Rx}$ are generated in addition to those referred to above. Memory 16, accordingly, now has six stages which are sequentially loaded by multiplexer 15. Store 18 alternately works into visual indicator 19 and into a similar indicator 19', giving the elevational angle ε, by way of a switch 23. This switch may be manually operated or could be designed as a multiplexer controlled by the programmer 22.

Calculator 17 performs the following algebraic operations:

$$P_x = V_{Dy} \cdot V_{Rz} - V_{Dz} \cdot V_{Ry} \tag{1}$$

$$P_y = V_{Dz} \cdot V_{Rx} - V_{Dx} \cdot V_{Rz} \tag{2}$$

$$P_z = V_{Dx} \cdot V_{Ry} - V_{Dy} \cdot V_{Rx} \tag{3}$$

$$\alpha = \arctan\left(\frac{p_x}{p_y}\right) \tag{4}$$

$$\epsilon = \arctan\left(\frac{p_z}{\sqrt{p_x^2 + p_y^2}}\right) \tag{5}$$

Equations (3) and (5) are, of course, performed only by the system of FIG. 2.

The foregoing equations are given solely by way of example since the desired data could also be obtained in some other way, e.g. according to the formulas given in German Pat. No. 1,080,633.

I claim:

1. In a radiolocation system, in combination:
an antenna array adapted to intercept incident electromagnetic waves, said array comprising three loop antennas in mutually orthogonal planes and three dipole antennas extending along the intersections of said planes;
a first set of output terminals each connected to an individual dipole antenna of said array;
a second set of output terminals each connected to an individual loop antenna of said array;
a first and a second receiving channel;
first and second switch means for respectively connecting individual outputs of said first set to said first receiving channel and individual outputs of said second set to said second receiving channel;
scanning means for jointly operating said first and second switch means to connect said receiving channels to a multiplicity of different combinations of a loop antenna with a dipole antenna during successive phases of a recurrent cycle, thereby feeding a pair of analog output voltages from selected antennas to said channels in each of said phases;
multiplication means connected to said receiving channels for forming the product of said pair of output voltages in each phase, said multiplication means comprising a multiplier, a low-pass filter and an integrator in cascade;
a memory with a multiplicity of stages respectively assigned to said different combinations;
third switch means controlled by said scanning means for sequentially connecting said multiplication means to said stages, thereby loading same with the voltage products obtained in respective phases; and
arithmetic means connected to said memory for algebraically combining the voltage products loaded into said stages in each cycle to derive directional data therefrom.

2. The combination defined in claim 1, further comprising analog/digital conversion means inserted between said multiplication means and said third switch means.

3. The combination defined in claim 2, further comprising storage means for said directional data connected to said arithmetic means and display means connectable to said storage means.

* * * * *